(12) United States Patent
Meyer et al.

(10) Patent No.: US 9,083,174 B2
(45) Date of Patent: Jul. 14, 2015

(54) THERMAL OVERLOAD PROTECTION APPARATUS

(75) Inventors: Thomas Meyer, Ottenstein (DE); Steffen Pförtner, Springe (DE); Friedrich-Eckhard Brand, Barntrup (DE); Bernd Pötzsch, Detmold (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 164 days.

(21) Appl. No.: 13/814,483

(22) PCT Filed: Aug. 5, 2011

(86) PCT No.: PCT/EP2011/063560
§ 371 (c)(1),
(2), (4) Date: Mar. 28, 2013

(87) PCT Pub. No.: WO2012/017089
PCT Pub. Date: Feb. 9, 2012

(65) Prior Publication Data
US 2013/0194710 A1 Aug. 1, 2013

(30) Foreign Application Priority Data
Aug. 6, 2010 (DE) .......................... 10 2010 036 909

(51) Int. Cl.
*H02H 5/04* (2006.01)
*H01H 37/76* (2006.01)
(Continued)

(52) U.S. Cl.
CPC .............. *H02H 5/04* (2013.01); *H01H 37/767* (2013.01); *H01H 1/20* (2013.01); *H01H 1/2075* (2013.01); *H01H 2037/046* (2013.01)

(58) Field of Classification Search
USPC ........................................................ 361/103
See application file for complete search history.

(56) References Cited

U.S. PATENT DOCUMENTS 4,652,964 A * 3/1987 Ziegenbein ..................... 361/54
5,191,605 A    3/1993 Brower
(Continued)

FOREIGN PATENT DOCUMENTS

DE    19710183    8/1998
DE    19708651    9/1998
(Continued)

OTHER PUBLICATIONS

International Search Report Dated Nov. 11, 2011 for application WO 2012/017089.

*Primary Examiner* — Dharti Patel
(74) *Attorney, Agent, or Firm* — Knobbe, Martens, Olson & Bear LLP

(57) ABSTRACT

The object of the invention is a thermal overload protection device (22) for protecting an electric component (10), in particular an electronic component, wherein the overload protection device (22) has a short-circuit unit (24) for short-circuiting connections (12, 14) of the component (10), and an actuating member (26) actuating the short-circuit unit (24) in a temperature sensitive manner. According to the invention it is provided that the short-circuit unit (24) is attached to a circuit path support (16) in at least one area (28), and is supported in at least another area (30) on the component (10) disposed on the circuit path support (16) via the actuating unit (26), and/or at least one of the circuit paths (18, 20) contacting one of the connections (12, 14) to be short-circuited.
The invention further relates to a respective arrangement (36) having a circuit path support (16), at least one component (10) disposed thereupon, and at least one assigned overload protection device (22).

9 Claims, 4 Drawing Sheets

Figure 1:
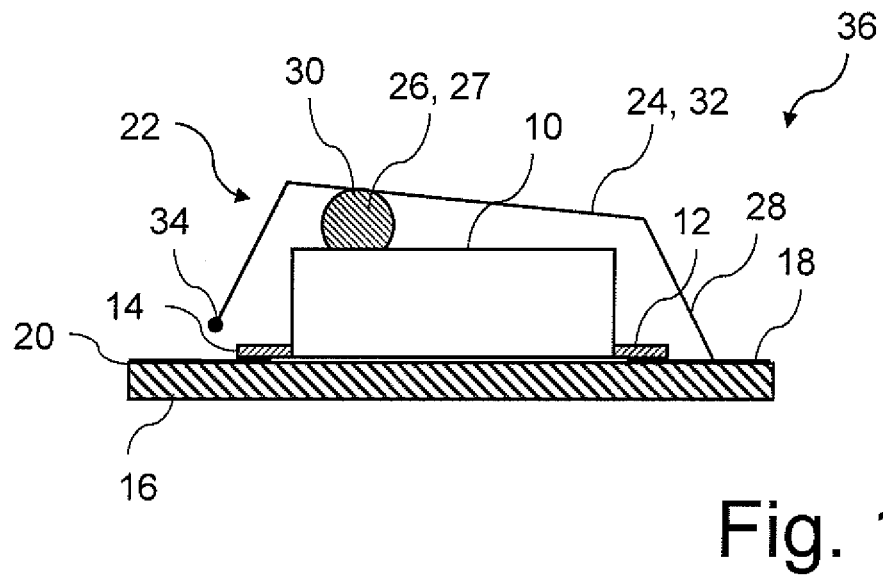

(51) Int. Cl.
*H01H 1/20* (2006.01)
*H01H 37/04* (2006.01)

(56) References Cited

U.S. PATENT DOCUMENTS

| | | | | |
|---|---|---|---|---|
| 6,735,065 | B2 * | 5/2004 | Graf et al. | 361/103 |
| 7,504,925 | B2 * | 3/2009 | Graf et al. | 337/159 |
| 7,639,114 | B2 * | 12/2009 | Yu | 337/405 |
| 7,742,269 | B2 * | 6/2010 | Shinohara | 361/103 |
| 8,039,760 | B2 * | 10/2011 | Sagawa et al. | 174/260 |
| 8,203,819 | B2 * | 6/2012 | Bobert | 361/124 |
| 8,749,940 | B2 * | 6/2014 | Schmidtlein | 361/103 |
| 8,816,390 | B2 * | 8/2014 | Marbella et al. | 257/173 |
| 2002/0036880 | A1 * | 3/2002 | Kanamaru et al. | 361/103 |

FOREIGN PATENT DOCUMENTS

| | | |
|---|---|---|
| EP | 1467603 | 10/2004 |
| EP | 1970932 | 9/2008 |
| FR | 2670624 | 6/1992 |
| JP | 62166589 | 10/1987 |

* cited by examiner

THERMAL OVERLOAD PROTECTION APPARATUS

REFERENCE TO RELATED APPLICATIONS

The present application is the U.S. National Phase under 35 U.S.C. §371 of International PCT application number PCT/EP2011/063560, filed Aug. 5, 2011, which claims priority to German Application No. 10 2010 036 909.8, filed Aug. 6, 2010, each of which is incorporated herein by reference in its entirety.

The invention relates to a thermal overload protection component for the protection of an electric component, in particular an electronic component, wherein the overload protection component has a short-circuit unit for short-circuiting connections of the component, and a actuating unit for actuating the short-circuit unit in a temperature-sensitive manner.

Such overload protection component is known form the patent application DE 10 2008 022 794 A1. It describes a thermal overload protection component comprising a short-circuit unit with a shorting bar for short-circuiting electrodes of an overload deflector, and a melting element actuating the overload protection component.

The overloading of electronic components may lead to the fact that they operate outside of a nominal operating range. For this purpose a performance rate caused by a reduced insulation stability of the component leads, for example, to increased heating of a damaged component. If the heating of the component beyond a permissible threshold is not prevented, this may lead, for example, to the damage of surrounding materials, the formation of flue gas, or to a fire hazard.

These hazards are also present with an arrangement of components disposed on a circuit path support, such as surface-mountable components. In order to assembly such an arrangement, the circuit path support (the circuit board) is equipped with and soldered to respective components, such as machines. Due to the tight mounting, a very limited installation space is often the result.

The object of the invention is to provide a thermal overload protection component requiring little installation space, safely responds to a thermal overload, safely short-circuits, and is easily integrated into an installation process of an installation, in particular a surface installation, of components on a circuit path support.

The solution of this task is carried out according to the invention by means of the characteristics of the independent claim. Advantageous embodiments of the invention are stated in the sub-claims.

It is provided in the overload protection component according to the invention that the short-circuit unit is attached to a circuit path support in at least one area, and is supported in at least one additional area via the actuating unit on the component disposed on the circuit path support, and/or at least one of the circuit paths contacting one of the short-circuiting connections. The overload protection components offers the additional advantage that the component, and in particular, the solder joints between the connections and the circuit paths are stressed little during operation. Another advantage is that the components mounted may subsequently be equipped with overload protection components. The supporting of the additional area via an actuating unit on the components includes particularly the supporting at one of the connections of the component. Advantageously, it is provided that the actuating unit (activating unit) is embodied as a melting member being actuated by means of melting. The melting temperature of the melting member governs the actuating temperature, which therefore can be adjusted via the material selection.

It is preferably provided that for short-circuiting the connections, the short-circuit unit electrically contacts circuit paths being connected with said connections. For this purpose the short-circuit flow is guided about the component at a "generous distance."

In particular it is provided that the short-circuit unit has a spring member, or is a spring member. The contact pressure required for the contacting may be realized in a particularly easy manner by means of a spring member.

Alternatively, or additionally, it is advantageously provided that the short-circuit unit has an element of a shape memory material, and/or of an intumescent material, and/or of a material chemically changing its shape as an actuator. Said actuator ensures the contact pressure necessary for contacting with the respective temperature. Additionally, with a respective design of the short circuit unit starting of the element, the actuating unit may also be embodied from a shape memory material, and/or an intumescent material. Such materials are formed by respective functional plastics.

An electrically conducting element made from the shape memory material, in particular an electrically conducting shape memory metal, may form, or co-form the short-circuit unit as an alternative to the spring member.

According to a preferred embodiment of the invention it is provided that the short-circuit unit is elastically supported on the component at the continued area via the actuating unit, in particular the melting member. In this manner a pretensioning of the short-circuit unit may be realized in a simple manner.

According to another preferred embodiment of the invention it is provided that the actuating unit has a material, the actuating temperature of which is lower than a melting temperature of a solder joint between the circuit paths and the connections of the component to be short-circuited. In particular it is provided that the melting member has a material, the melting point is lower than that of a solder joint between the circuit paths and the connections of the component to be short-circuited. Preferably the material is an electrically insulating material, particularly preferred a melting plastic. Such material is particularly suitable for surface mountable components, which are attached to/contacted by the circuit paths via "reflow soldering," since the activating temperature of the melting member is below the solder temperature of about 240° C. In particular it is provided that the temperature difference of the melting temperatures is at least 20° C. (20 K). This brings about clearly defined chronological sequences due to the thermal overload, which increases safety and the switching dynamics. The melting plastic further offers the advantage that it does not age because of the soldering process, since it is applied in retrospect. This is due to the fact that its melting temperature is below the common temperature during the reflow soldering process.

Compared to a solder the melting plastic exhibits a softer transition of its consistency at the melting point. This has the advantage that a actuating unit made of melting plastic may remain at its original position even in case of an actuation, and merely changes its shape due to the actuation such that the short-circuit unit may short-circuit the component.

According to a further development of the invention it is provided that the short circuit unit is permanently coupled to at least one of the connections to be short-circuited. Preferably the number of connections to close for the short-circuiting is merely one single connection. This creates clearly defined, reproducible "switching processes."

According to a preferred embodiment of the invention it is provided that the short-circuit unit has two parts, which contact each other by means of actuating the actuating unit, in particular by means of melting the melting member, for short-circuiting the same.

According to an additionally preferred embodiment of the invention it is provided that the short-circuit unit completely over-tensions the component in at least one alignment. This is possible in a particularly easy manner in case of an installation of the components in a first installation step, and an installation of the overload protection device in a subsequent installation step.

The invention further relates to an arrangement with a circuit path support, at least one component disposed thereon, and at least one overload protection device mentioned above. The component is preferably an overload protection deflector, in particular on the basis of a semi-conductor (suppressor diode, varistor, etc.), or a gas-filled over-voltage deflector, or a resistor.

The invention is explained in further detail with reference to the attached drawing based on preferred embodiments.

They show

Figure 2:
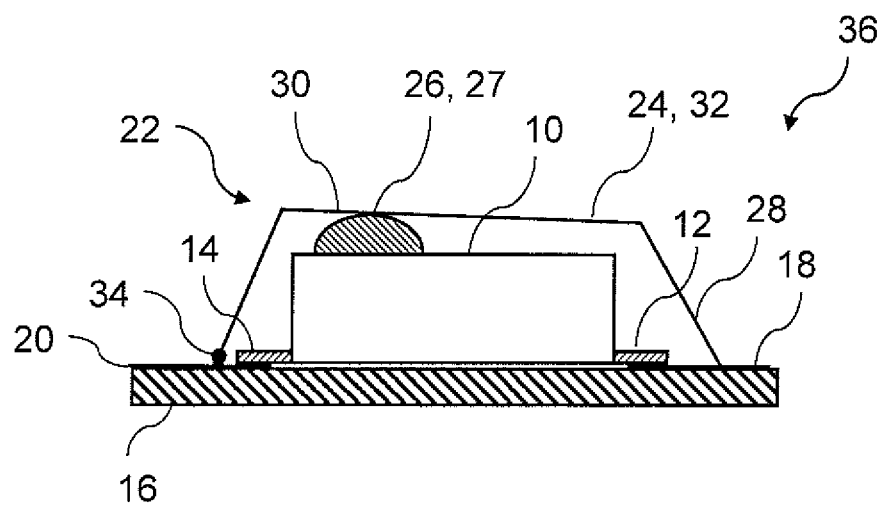
Figure 3:
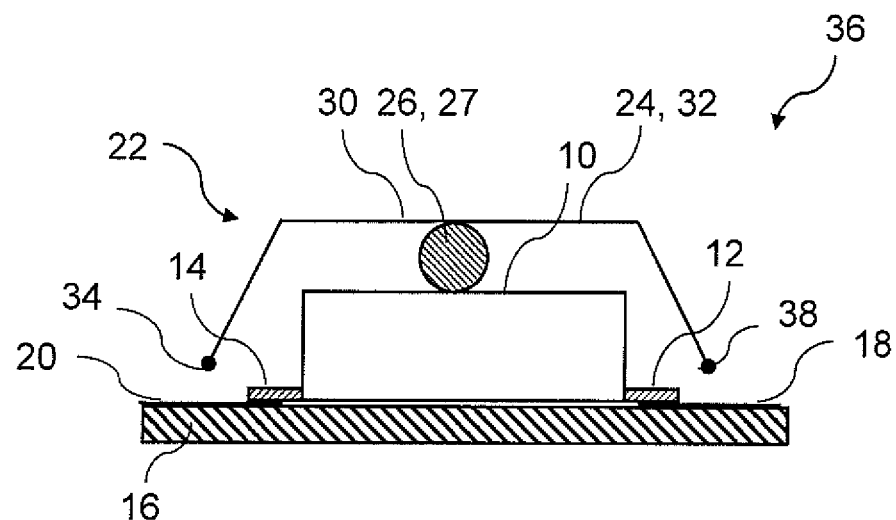
Figure 4:
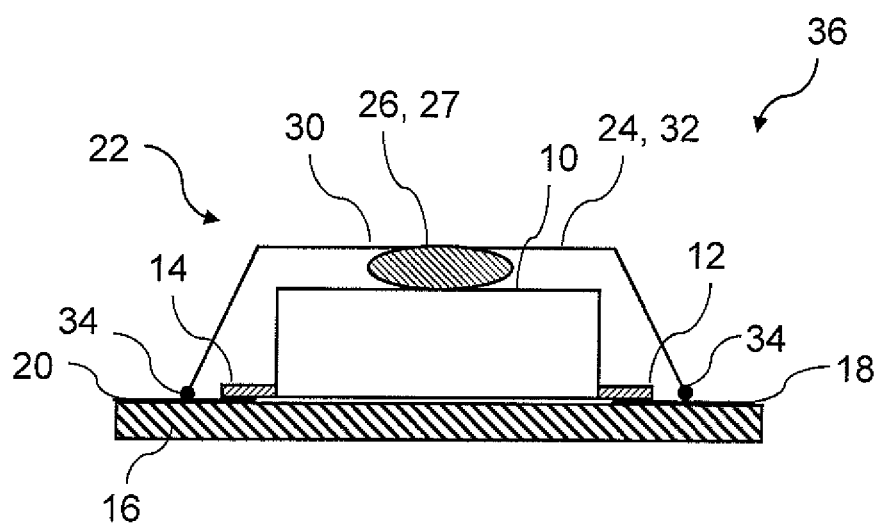
Figure 5:
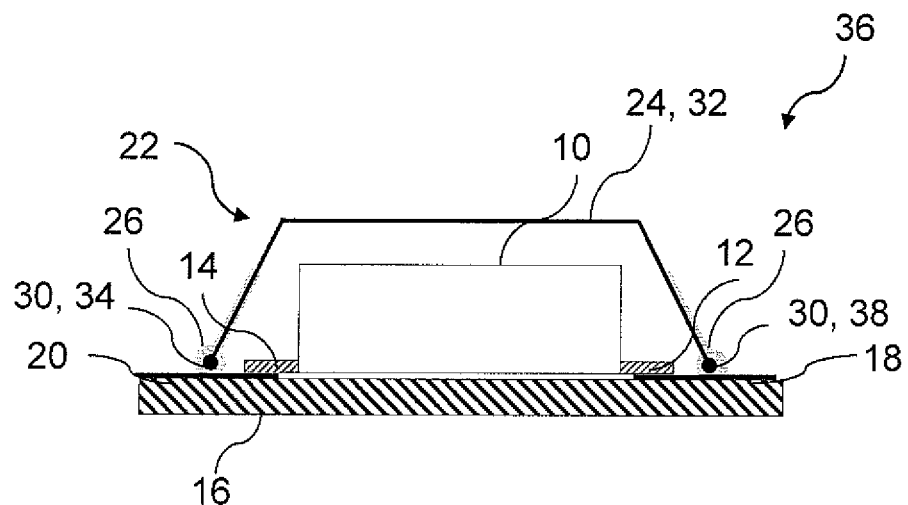
Figure 6:
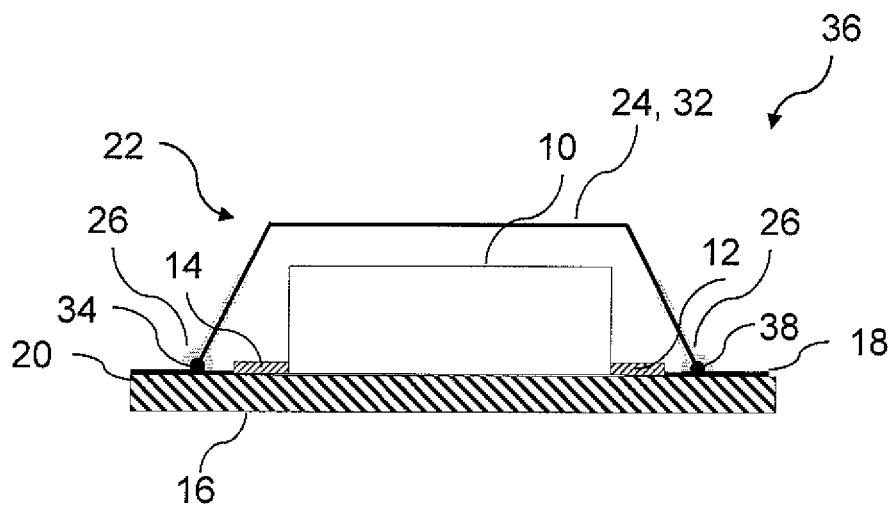
Figure 7:
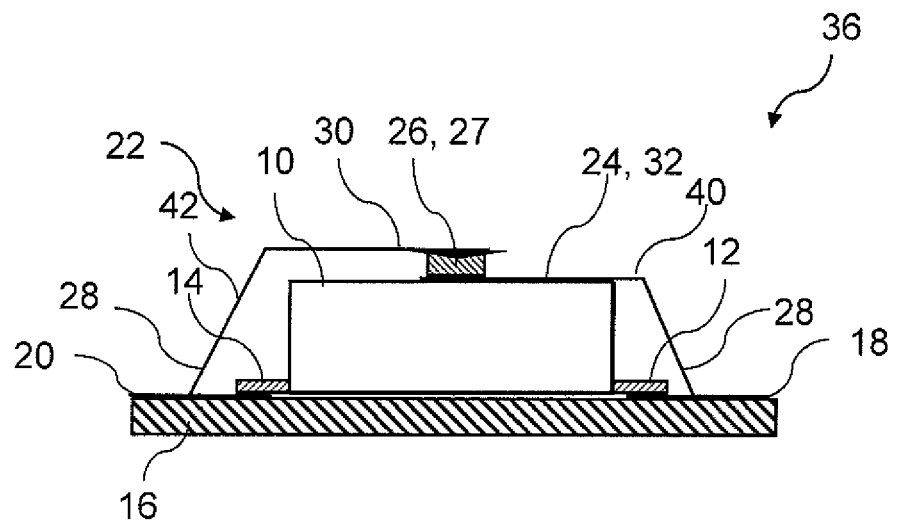
Figure 8:
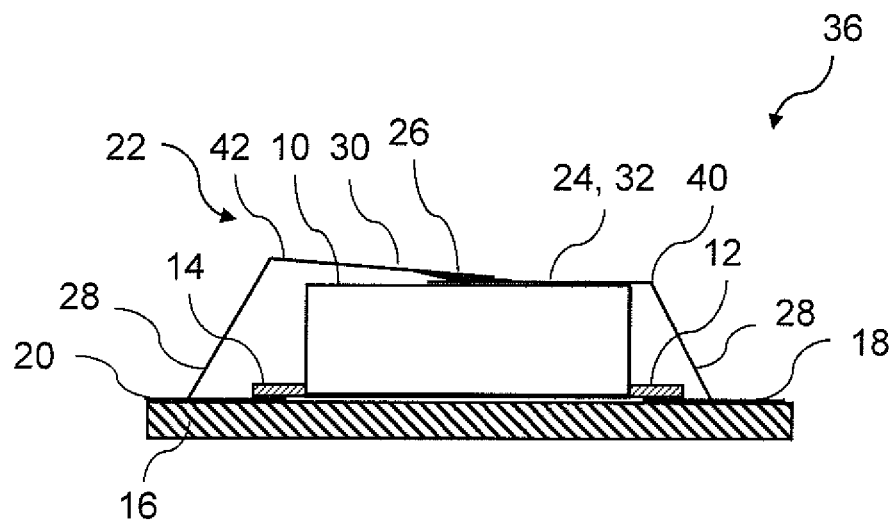

FIG. 1 an electronic component and a thermal overload protection device in a non-actuated operating mode according to a first embodiment of the invention, FIG. 2 the component and the thermal overload protection device of FIG. 1 in the actuated operating mode, FIG. 3 an electronic component and a thermal overload protection device in the non-actuated operating mode according to a second embodiment of the invention, FIG. 4 the component and the thermal overload protection device of FIG. 3 in the actuated operating mode, FIG. 5 an electronic component and a thermal overload protection device in the non-actuated operating mode according to a third embodiment of the invention, FIG. 6 the component and the thermal overload protection device of FIG. 5 in the actuated operating mode, FIG. 7 an electronic component and a thermal overload protection device in the non-actuated operating mode according to a fourth embodiment of the invention, and FIG. 8 the component and the thermal overload protection device of FIG. 7 in the non-actuated operating mode.

FIG. 1 shows an electric component 10 embodied as an electronic component, having two connections 12, 14, being attached on a circuit path support 16 by means of said connections 12, 14. For this purpose the connections 12, 14 are conductively connected with assigned circuit paths 18, 20 of the circuit path support 16 by means of solder joints (not shown). A thermal overload protection device 22 having a short-circuit unit 24 embodied as a shorting bar for short-circuiting the connections 12, 14, and an actuating unit 26 actuating the short-circuit unit 24 in a temperature sensitive manner is disposed above the component 10. For this purpose the actuating unit 26 is a melting unit 27 that is actuated by means of melting. The material of the melting unit 27 is melting plastic having a melting temperature that is significantly lower than that of the solder of the solder joints. The component 10 is embodied as a surface-mountable component (SMD component), and accordingly is installed on the surface of the circuit path support 16 embodied as a circuit board.

The short-circuit unit 24 is attached to an area 28 at one of the circuit paths 18 embodied as an end area in an electrically conducting manner, and is supported across a further area 30 embodied as a center area via the melting unit 27 at the top side of the component 10 in an elastic manner. For this purpose the short-circuit unit 24 has at least one partial area being embodied as a spring member 32. Another area 34 embodied as another end area, is held at a distance at this arrangement 36 of the component 10, the circuit path support 16, and the overload protection device 22 above the other circuit path 20.

This results in the following function: if a thermal overload of the component 10 occurs, the same is heated until it has also heated the melting element 27 to a temperature via the surface thereof, which is within the range of its melting temperature. If the melting member 27 melts, the other end area 34 is pressed onto the other circuit path 20 by means of the spring force of the pretensioned spring member 32 such that the short-circuit unit 24 forms a shorting bar completely overstretching the component 10.

FIGS. 3 and 4, or 5 and 6, as well as 7 and 8, respectively, essentially correspond to FIGS. 1 and 2 such that only the differences shall be explained in the following.

In the embodiment of FIGS. 3 and 4 the short-circuit unit is embodied in a T shape, wherein the one area 28 of the short-circuit unit 24 attached to the circuit path support is not visible. Contrary to the overload protection device of FIGS. 1 and 2 there are two other areas 34 at this location, 38 being embodied as other end areas. These are held at a distance above the respectively assigned circuit paths 18, 20 during normal operation.

If a thermal overload of the component 10 occurs, the same is heated until it has also heated the melting member 27 to a temperature via its surface, which is within the range of its melting temperature. If the melting member 27 melts, the other end areas 34, 38 are pressed onto the assigned circuit paths 18, 20 via the spring force of the pretensioned spring member 32 such that the short-circuit unit 24 forms a shorting bar completely overstretching the component 10.

The embodiment of FIGS. 5 and 6 is an alternative to the embodiment of FIGS. 3 and 4. Instead of a melting member 27 on the component 10, two melting members 27 surrounding the other areas 34, 38 are provided. The short-circuit unit 24 is supported on the circuit paths 18, 20 contacting the connections 12, 14 to be short-circuited, together with the other areas 34, 38 embodied as additional areas 30 via the melting members 27.

If a thermal overloading of the component 10 occurs, the connections 12, 14 also heat the circuit paths 18, 20 until they have also heated the melting members 27 to a temperature that is within the range of its melting temperature. If the melting members 27 melt, the other end areas 34, 38 are pressed onto the assigned circuit paths 18, 20 via the spring force of the pretensioned spring member 32 such that the short-circuit unit 24 forms a shorting bar completely overstretching the component 10.

Finally, the embodiment of FIGS. 7 and 8 is an embodiment having a short-circuit unit 24 being divided into two parts, comprising two ends 28 being attached to the circuit paths 18, 20. The two parts 40, 42 are separated again by the melting member 27 during the operation. For this purpose the further area 30 of the one part 42 of the short-circuit unit is supported on component 10 being disposed on the circuit path support 16. If the same melts due to the heat of the component 10, the parts 40, 42 contact each other, and a short-circuit is created.

As an alternative to the spring member 32, the short-circuit unit 24 may also be formed by means of an electrically conductive shape memory metal (not shown). The spring member 32 is utilized, supported on the melting member 27, in a pretensioned manner.

The motion may also be caused by means of applying a force via the actuator based on intumescent materials, or a thermally activated chemical reaction accompanied by a volume increase. For this purpose respective actuating members 26 are provided, which in particular are also actuators of the short-circuit unit 24.

In the operating mode the switch formed by the spring member 32 and the circuit path 18, 20, or by a contacting surface on the circuit path support (circuit board) 16, or at the component 10, is open. An inadmissible heating of the component 10 via the activating or actuating temperature leads to the activation of the device 22:

The spring member 32 briefly closes the component 10 due to the softening melting plastic.

The shape memory member carries out an irreversible movement upon exceeding the transition temperature, which short-circuits the component 10.

The intumescent material, or the volume increase based on a chemical reaction applies a force onto the spring member 32 such that the same closes the contact. The electric contacting leads results in a short-circuit of the electric component 10. The component 10 is thereby transferred into a safe mode.

LIST OF REFERENCE SYMBOL

Component 10
Connection 12
Connection 14
Circuit path support 16
Circuit path 18
Circuit path 20
Overload protection device 22
Short-circuit unit 24
Actuating member 26
Melting member 27
Area 28
Further area 30
Spring member 32
Other area 34
Arrangement 36
Other area 38
Part 40
Part 42

The invention claimed is:

1. A thermal overload protection device for protecting an electric component mounted on a circuit path support, the thermal overload protection device comprising:

a short-circuit unit for short-circuiting connections of the electric component, the electric component being connected to assigned circuit paths of the circuit path support by solder joints; and a temperature sensitive actuating unit actuating the short-circuit unit, wherein the short-circuit unit is attached to the circuit path support in at least one area, and is supported in at least a further area via the temperature sensitive actuating unit at the electric component, and/or at least on one of the circuit paths contacting the connections to be short-circuited.

2. The overload protection device of claim 1, wherein the temperature sensitive actuating unit comprises a melting member to be actuated by means of melting.

3. The overload protection device of claim 1, wherein the short-circuit unit electrically contacts circuit paths connected to the connections for short-circuiting the connections.

4. The overload protection device of claim 1, wherein the short-circuit unit has a spring member, or is a spring member.

5. The overload protection device of claim 1, wherein the short-circuit unit comprises at least one material chosen from the group consisting of a shape memory material, an intumescent material, and a material chemically changing its shape as actuator.

6. The overload protection device of claim 1, wherein the short-circuit unit is supported at the further area via the temperature sensitive actuating unit on the electric component in an elastic manner.

7. The overload protection device of claim 1, wherein the temperature sensitive actuating unit comprises a material having an actuating temperature lower than a melting temperature of a solder joint between the circuit paths and the connections of the electric component to be short-circuited.

8. The overload protection device of claim 1, wherein the short circuit unit is permanently electrically coupled to at least one of the connections to be short-circuited.

9. The overload protection device of claim 1, wherein the short circuit unit has two parts contacting each other by means of the actuation of the temperature sensitive actuating unit for short-circuiting.

* * * * *